(12) United States Patent
Banister

(10) Patent No.: US 6,775,261 B1
(45) Date of Patent: Aug. 10, 2004

(54) FREQUENCY DIVISION MULTIPLE ACCESS SYSTEM SEARCHING

(75) Inventor: Brian C. Banister, San Diego, CA (US)

(73) Assignee: LSI Logic Corporation, Milpitas, CA (US)

( * ) Notice: Subject to any disclaimer, the term of this patent is extended or adjusted under 35 U.S.C. 154(b) by 426 days.

(21) Appl. No.: 09/586,840

(22) Filed: Jun. 5, 2000

(51) Int. Cl.[7] .............................................. H04B 7/208
(52) U.S. Cl. ..................................... 370/344; 370/330
(58) Field of Search ................................ 370/310, 311, 370/328, 329, 330, 335, 336, 343, 344, 210, 295; 340/870.11

(56) References Cited

U.S. PATENT DOCUMENTS

| | | | | |
|---|---|---|---|---|
| 4,811,421 A | * | 3/1989 | Havel et al. ................... 455/69 |
| 5,245,340 A | * | 9/1993 | Loo et al. ..................... 341/118 |
| 5,706,202 A | * | 1/1998 | Itahara et al. .................. 702/77 |
| 5,715,235 A | * | 2/1998 | Sawahashi et al. ........... 370/206 |
| 6,418,127 B1 | * | 7/2002 | Laurent ....................... 370/311 |
| 6,483,815 B1 | * | 11/2002 | Laurent et al. .............. 370/318 |
| 6,519,477 B1 | * | 2/2003 | Baier et al. ............... 455/67.11 |

* cited by examiner

Primary Examiner—Hassan Kizou
Assistant Examiner—D Levitan
(74) Attorney, Agent, or Firm—Duane Morris LLP

(57) ABSTRACT

Channels are acquired and/or searched in a frequency division multiple access (FDMA) wireless system. Initially, a signal that includes a block of FDMA channels is received and filtered so as to select a frequency band that includes the block of FDMA channels. The filtered signal is then processed to obtain measures of certain frequency components in the filtered signal, and a power estimate for at least one of the FDMA channels is calculated based on at least one of frequency component measures.

40 Claims, 4 Drawing Sheets

FREQUENCY DIVISION MULTIPLE ACCESS SYSTEM SEARCHING

BACKGROUND OF THE INVENTION

1. Field of the Invention

The present invention relates to searching to acquire a frequency division multiple access system and particularly relates to searching techniques that may be implemented in a dual mode (digital/analog) wireless telephone or other wireless device.

2. Description of the Related Art

In wireless communications technology, user data (e.g., speech, signaling messages, alphanumeric data) modulate a radio frequency signal for transmission and reception between a base station and a mobile unit. The radio spectrum allocated by regulatory authorities for a wireless system is "trunked" to allow simultaneous use of a spectrum block by multiple units.

Most analog cellular telephone systems are frequency division multiple access (FDMA) systems. In a FDMA system, a base station communicates with plural mobile units in the geographic region covered by the base station's antenna (often called a "cell" ) by utilizing a separate frequency channel for each separate communications link. The number of channels used by the system therefore defines the number of mobile units that can be simultaneously communicating on the FDMA system in any given cell.

For example, in the United States the Advanced Mobile Phone System (AMPS) is a FDMA system that utilizes frequency modulation for providing mobile cellular telephony. Within each cell, AMPS uses a number of frequency channels to communicate with different mobile units. In order to acquire the AMPS system, the mobile unit typically must scan a number of dedicated control channels (DCCHs), such as 21 contiguous DCCHs and then return to the strongest.

Digital wireless communication systems, on the other hand, typically use time division multiple access (TDMA) or code division multiple access (CDMA) to permit a base station to simultaneously communicate with plural mobile units within a given cell. For instance, IS95 CDMA systems use CDMA in conjunction with FDMA while the global system for mobile communications (GSM) uses TDMA in conjunction with FDMA.

In TDMA, data are digitized and compressed to eliminate redundancy, thus decreasing the average number of bits required to be transmitted and received for the same amount of information. The time line of each of the frequency channels used by the TDMA system is divided into "frames" and each of the users sharing the common channel is assigned a time slot within the frames. Each user then transmits or receives a burst of data during its assigned time slot and does not transmit or receive during other times. With the exception of delays required by the bursty data transmission, which typically are small enough to be largely unnoticeable, the TDMA system will appear to the users sharing the frequency channel to have provided an entire channel to each user. In GSM, each channel is divided up in time into frames during which eight different users share the channel. A GSM time slot is only 577 $\mu$s(microseconds), and each user gets to use the channel for 577 ps out of every 4.615 ms (millisecond) time interval. 577 $\mu$s*8=4.615 ms.

Unlike the TDMA system, the CDMA system generally does not separate the multiple users of a common frequency channel using time slices. Rather, in CDMA, multiple users are separated from each other by superimposing a user-specific high-speed code on the data of each user. Because the applied code has the effect of spreading the bandwidth of each user's transmission, the CDMA system is often called a "spread spectrum" system. In the IS-95 CDMA standard, the spreading signal is applied at a rate of 1.2288 Mbps (megabits per second) and consists of a sequence of bits selected from one of 64 different orthogonal waveforms generated using Walsh functions multiplied by a pseudo-random noise (PN) code sequence. Each such Walsh function typically consists of a repeating 64-bit sequence, and thus has a period of 52.083 $\mu$s (64 bits/1.2288 Mbps). A different one of the 64 different Walsh functions is utilized for each sub-channel to be included in the frequency channel. At the receiving end, a particular sub-channel can be decoded using the same Walsh function and PN code that was used to encode the sub-channel. When decoded in this manner, the desired sub-channel signal is reproduced and the signals from the other 63 sub-channels are output as low-level noise. As a result, a user can distinguish its code sub-channel from other users' sub-channels on the same frequency channel.

As indicated above, various wireless systems use FDMA in conjunction with other trunking techniques. However, references to a FDMA system, FDMA channels or the like herein are intended to mean systems that trunk access using FDMA exclusively.

Conventionally, the initial step in attempting to acquire a FDMA system involves tuning the mobile's receiver to one of the channels used by the FDMA system, receiving transmissions on that channel, calculating a power reading based on the received transmissions, and then repeating these steps for each channel until all channels have been searched or until an adequate power reading has been obtained. Typically, this will require approximately 5 ms to tune the receiver and approximately 5 ms to obtain an accurate power reading, meaning that such a conventional technique requires approximately 10 ms per channel or approximately 210 ms to search all DCCHs in AMPS. During this time, the mobile unit is required to have its receiver turned on and generally cannot be used to receive or transmit for any other purpose.

The present inventor has recognized that such a long search time is particularly problematic in a dual mode digital/analog wireless telephone and can result in audio degradation and even the possibility of a dropped call when such a search is required to be performed during a telephone call. Moreover, even when performed at other times (e.g., during standby or during initial acquisition of a system), such a search can consume additional battery power.

SUMMARY OF THE INVENTION

The present invention addresses the foregoing problem by providing techniques for acquiring and/or searching channels in a FDMA system by processing a number of samples of a signal that includes a block of FDMA channels to obtain power estimates for such channels.

Thus, in one aspect, the invention is directed to acquiring/searching channels in a frequency division multiple access (FDMA) wireless system. Initially, a signal that includes a block of FDMA channels is received and filtered (e.g., using an analog filter to bandpass filter the signal) so as to select a frequency band that includes the block of FDMA channels (e.g., 21 contiguous channels, or all DCCH or similar channels used by the subject FDMA system). Next, the filtered signal is sampled to obtain a number of samples, and the samples are processed to obtain a value for each of multiple different frequency bins, such as by using Fast Fourier Transform processing. Based on these values, a measure of power is calculated for several of the FDMA channels.

The invention also addresses the foregoing problems by processing a received signal that includes a block of FDMA channels to obtain measures of various frequency components in the signal and then using at least one of those measures to calculate a power estimate for a FDMA channel.

Thus, in another aspect the invention is directed to acquiring/searching channels in a frequency division multiple access (FDMA) wireless system. Initially, a signal that includes a block of FDMA channels is received and filtered so as to select a frequency band that includes the block of FDMA channels. The filtered signal is then processed to obtain measures of certain frequency components in the filtered signal, and a power estimate for at least one of the FDMA channels is calculated based on at least one of frequency component measures.

By obtaining and processing samples corresponding to multiple FDMA channels in the foregoing manner, the present invention often can significantly reduce the amount of time that the receiver is tuned to the FDMA band. This can significantly reduce power consumption in the case that the mobile unit is awakening from a sleep or idle mode and then returning to a sleep idle mode, and can significantly improve communication quality in the case that the search is performed during communication on an alternate (e.g., digital) wireless system. Moreover, when such a technique is implemented in a dual mode wireless telephone, a wideband receiver capable of receiving the entire block of FDMA channels already exists and, therefore, no additional hardware typically is required.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Overview

The present invention provides an alternative method for searching for or invention preferably is capable of operating in both a FDMA analog system (such as AMPS) and in a digital system (such as CDMA). However, the techniques and teachings described herein are not limited to dual mode devices, but instead may be implemented in any other type of device using hardware, software, firmware, or any combination of the foregoing.

In the present embodiment, a group of FDMA channels is simultaneously received using a wider band receiver than typically is the case with a receiver conventionally used to receive each such FDMA channel. Thus, in the preferred embodiment, the CDMA (or other alternate mode of the receiver) portion of the circuit is used to receive a block of FDMA channels.

Once a sufficient sample corresponding to such a block of FDMA channels has been received, that sample is analyzed in the frequency domain to obtain power estimates for the various channels, which in turn can then be used to determine whether and how to begin communicating on the FDMA system.

A significant advantage of the present invention over conventional techniques is that once the signal sample has been obtained, the receiver then can be turned off or tuned to another frequency for use in other communications. Reducing the amount of time that the receiver is required to be tuned to FDMA frequencies can be used advantageously in several different ways. For example, shutting down the receiver earlier can reduce power consumption, thereby extending battery life. Alternatively, returning back to a digital mode (in a dual mode device) within a shorter period of time often can significantly reduce the likelihood of missing communications from the base station on such alternate mode, thereby improving the quality of such communications and reducing the likelihood of dropped calls or similar communications interruptions.

System Description

Figure 1:
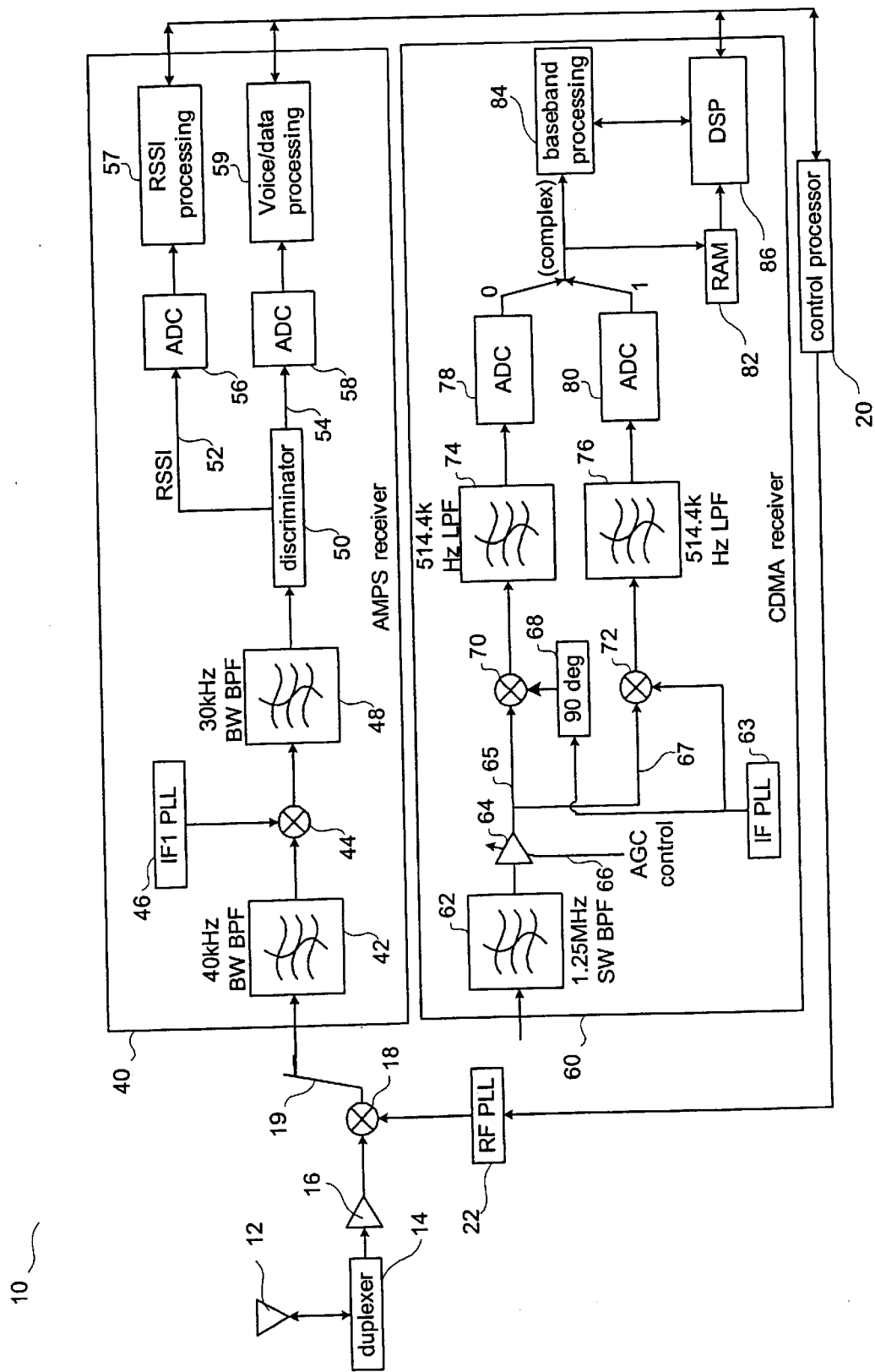
FIG. 1 is a simplified block diagram of a dual mode CDMA/AMPS receiver, representing an exemplary embodiment of the present invention.

FIG. 1 illustrates a simplified block diagram of a portion of a wireless transceiver for implementing the present invention. Included in system 10 is antenna 12, duplexer 14, amplifier 16, RF mixer 18, control processor 20, radio frequency (RF) phase lock loop (PLL) 22, FDMA receiver portion 40 and CDMA receiver portion 60. As indicated in FIG. 1, FDMA portion 40 is implemented as an AMPS receiver. However, any other FDMA receiver may be used instead. Similarly, CDMA receiver 60 may be replaced with any other receiver, preferably digital, and preferably having wide band reception capability as compared with the channel bandwidth for each FDMA channel. Alternatively, system 10 may consist of any other combination of hardware, software and/or firmware that is capable of implementing the functionality described below. For purposes of the following discussion, it will be generally assumed that system 10 is configured as shown in FIG. 1. However, this assumption is merely to simplify the following discussion and is not intended to limit the broad applicability of the teachings set forth herein.

In operation, antenna 12 receives and transmits radio signals in various wireless frequency bands. Duplexer 14 isolates the received signals and provides them to RF mixer 18 via amplifier 16. At the same time, under control of control processor 20, RF PLL 22 generates a RF signal (preferably, a signal that consists essentially of a single frequency) and provides that signal to RF mixer 18. These two input signals are then multiplied in RF mixer 18, providing the signal received at antenna 12 shifted in frequency by the frequency of the signal provided by RF PLL 22. The output of RF mixer 18 is then provided by switch 19 to either AMPS receiver 40 or CDMA receiver 60. Preferably, switch 19 is an electronic switch whose position is controlled by control processor 20.

In AMPS receiver 40, the input signal (having been frequency-shifted by a frequency corresponding to the desired AMPS channel) is supplied to 40 kiloHertz (kHz) bandwidth (BW) bandpass filter (BPF) 42, multiplied by the intermediate frequency provided by intermediate frequency (IF) PLL 46 in IF mixer 44, and then bandpass filtered by 30 kiloHertz BW BPF 48. As a result, the output of BPF 48 is a single AMPS channel, having as its center frequency the combination of the frequencies provided by RF PLL 22 and IF PLL 46. Next, discriminator 50 separates the signal provided by BPF 48 into a received signal strength indication (RSSI) signal 52 and an information signal 54. Those signals are then sampled and converted to digital format in analog-to-digital converters (ADCs) 56 and 58, respectively. Thereafter, RSSI processing is performed by module 57 on the output of ADC 56 and voice/data processing is performed by module 59 on the output of ADC 58.

In CDMA receiver portion 60, the input signal (having been frequency-shifted by a frequency corresponding to the desired CDMA channel) is bandpass filtered in 1.25 MegaHertz (MHz) BW BPF 62 and amplified in adjustable amplifier 64, with the gain for amplifier 64 being specified by an automatic gain control (AGC) signal 66, preferably provided by control processor 20. Thereafter, the signal is multiplied by an intermediate frequency provided by IF PLL 63. Specifically, the output of amplifier 64 is provided both to a path 65 and to a path 67. The signal on the path 67 is multiplied by the output of IF PLL 63 in IF mixer 72, and the signal on path 65 is multiplied by the output signal of IF PLL 63, as phase-shifted 900 by 90-degree phase-shifter 68, in IF mixer 70. The outputs of IF mixers 70 and 72 are low-pass filtered in 614.4 kHz low-pass filters 74 and 76, respectively, and then converted to digital format in ADCs 78 and 80, respectively. The outputs of ADCs 78 and 80 therefore represent the complex values of the sampled received signal. Those complex data values are stored in RAM 82 and subject to immediate processing in baseband processing module 84 in connection with digital signal processor (DSP) 86. In addition, DSP 86 preferably also is programmed to read data values from RAM 82 and process the retrieved data.

Thus, in ordinary operational modes, dual mode receiver 10 is capable of processing either AMPS signals or CDMA signals, with dedicated hardware provided for each such mode. In addition, as described in detail below, the present invention utilizes the CDMA receiver portion 60 for simultaneously processing multiple AMPS channels. Moreover, by using the wider band CDMA receiver portion 60 for this purpose, receiver 10 can be tuned to receive the FDMA signal for a significantly shorter period of time than is possible with many conventional techniques.

Figure 2:
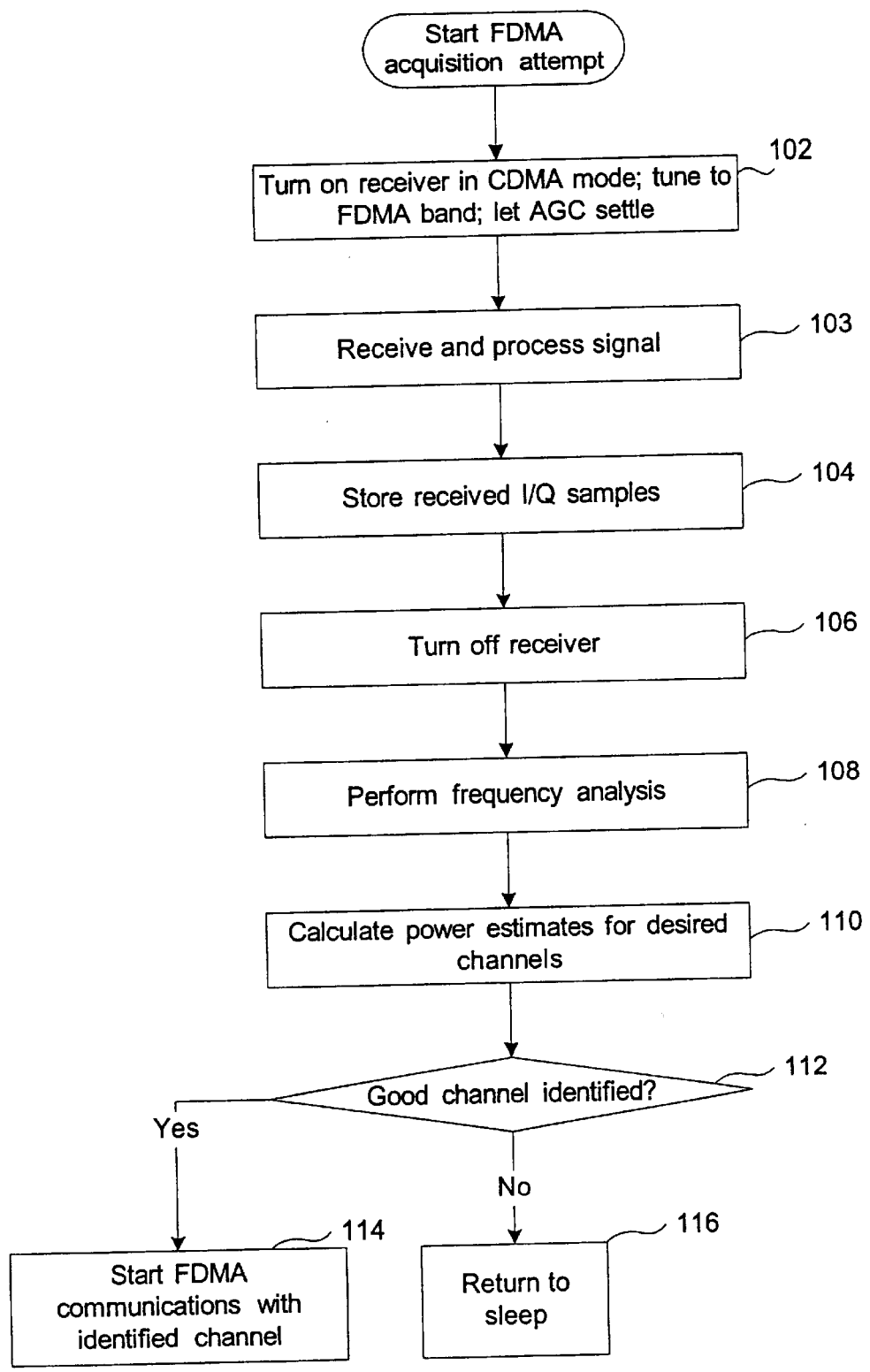
FIG. 2 is a flow diagram illustrating FMDA acquisition in a representative embodiment of the invention.

FIG. 2 illustrates a flow diagram for explaining processing performed to attempt to acquire a FDMA system in a representative embodiment of the present invention. Ordinarily, such acquisition attempts will be made when the wireless telephone (or other device) is initially activated. In the preferred embodiment of the invention, when the wireless device initially is activated it first attempts to acquire a digital system (such as CDMA). Failing in this attempt, the wireless device then attempts to acquire the FDMA system, preferably according to the processing shown in FIG. 2.

Briefly, according to FIG. 2, the receiver is turned on in CDMA mode, tuned to the FDMA band, and the automatic gain control is allowed to settle; the signal is received and processed; the received I/Q samples are stored; the receiver is turned off; frequency analysis is performed; power estimates are calculated for desired channels; and if a good channel is identified, FDMA communications are initiated using the identified channel; otherwise, the wireless device returns to the sleep mode.

In more detail, in step 102 the receiver is activated in CDMA mode. However, the receiver is tuned to the appropriate FDMA band, e.g., RF PLL 22 is set to provide a frequency corresponding to the band of channels under consideration. In AMPS, such block of channels might include, for example, channels 313 to 333 (i.e., 879.390 MHz to 879.990 MHz) or channels 334 to 354 (i.e., 880.020 MHz to 880.620 MHz). Reception then occurs in this mode for a short period of time without collecting samples in order to allow the automatic gain control to settle.

Figure 3:
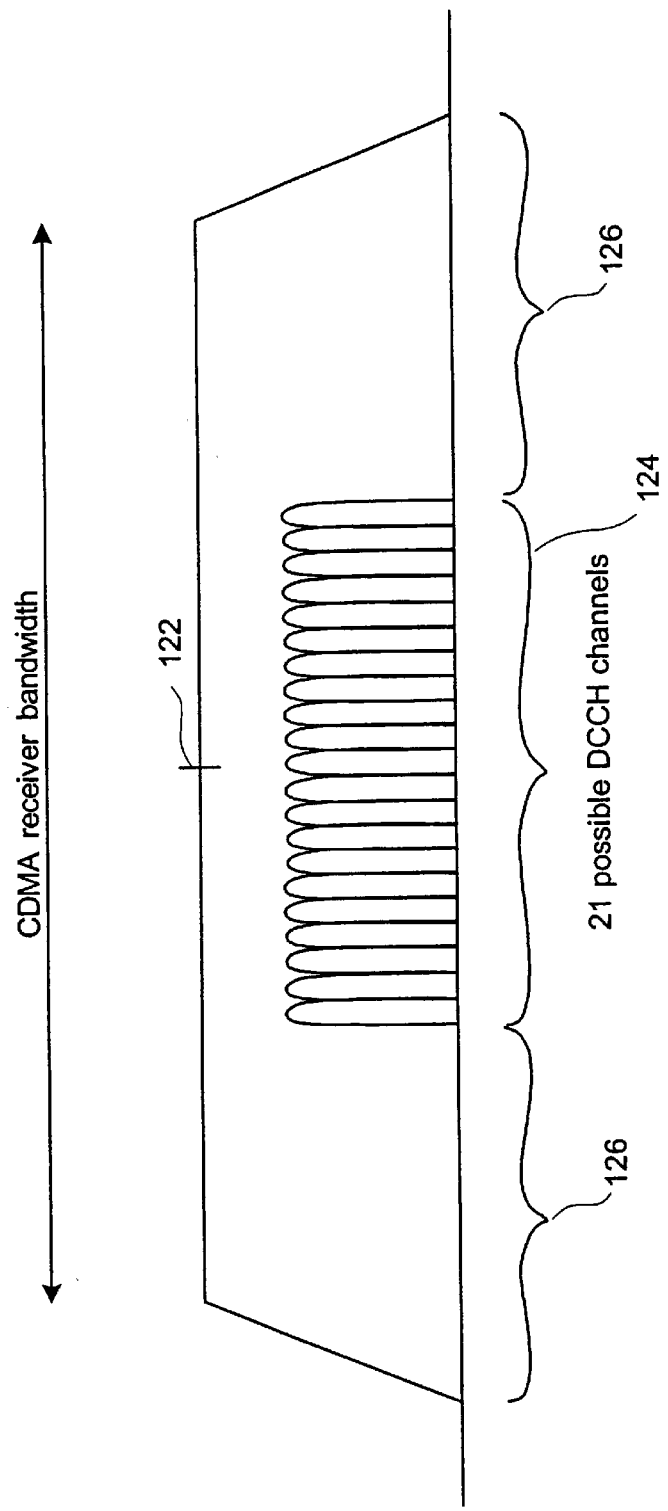
FIG. 3 illustrates a spectral analysis of dedicated control channels in a FDMA system as compared with the receiver bandwidth of a CDMA system.

Thereafter, in step 103 samples are generated by CDMA receiver portion 60. This situation is illustrated in FIG. 3 for an AMPS system having 21 possible DCCH channels. As shown in FIG. 3, the receiver has been tuned (using RF PLL 22 in combination with IF PLL 63) so that the center of the CDMA receiver bandwidth 122 coincides with the center of the group of 21 DCCH channels 124. As noted above, the CDMA bandwidth is 1.2288 MegaHertz while the 21 DCCHs occupy 630 kiloHertz. The entire CDMA bandwidth is retained by setting ADCs 78 and 80 to sample at a rate of 1.2288 Mbps.

In step 104, the received complex data values corresponding to the sampled signal are stored in RAM 82. As is well-known, the frequency resolution for a Fast Fourier Transform (FFT) is $F_s/N$, where $F_s$ is the sampling rate and N is the number of samples to be processed. In the present case, the sampling rate is 1.2288 Mbps. In addition, for ease of computation N generally must be a power of two. Because the DCCH channels are approximately 30 kiloHertz wide in 30 kiloHertz channel spacings, a good choice for N would be 128 samples, providing 9.6 kiloHertz resolution. This would ensure that the center of a frequency bin is no more than 4.8 kiloHertz away from the center of each AMPS channel. However, other values of N could be used instead, such as 32, 64, 256, 512, 1024 or more than 1024 samples. Also, while most frequency transformations are computationally efficient if N is a power of 2, it is nevertheless possible to perform frequency transformations using values of N that are not powers of 2. In addition, it is possible to use an arbitrary value for N and then zero-pad out to the next higher power of 2.

In step 106, after the desired number of samples have been collected, the receiver is turned off.

In step 108, frequency analysis is performed on the collected samples. Preferably, this is accomplished by performing a FFT transformation on the collected samples. However, other techniques may be utilized, such as a discrete cosine transformation (DCT) or any other techniques for identifying the spectral components of a signal, such as using a bank filters that have been tuned to different frequencies, or using any other digital, analog or optical techniques for frequency analysis. As noted above, preferably a number of samples has been collected that is equal to a power of 2. However, if some other number of samples has been collected, then zero padding can be used to increase the number of samples to a power of 2. Alternatively, the generalized form of the discrete time FourierTransform (ratherthan the FFT) or a similar generalized frequency transformation can be performed.

It is further noted that prior to performing the frequency transformation it may be desirable to apply a weighting function to the collected samples (together with any zero padding) so as to shape the frequency response of each of the individual frequency bins (e.g., to reduce the side lobe response). On the other hand, if a sufficient number of samples is collected this additional weighting step may be unnecessary.

Preferably, step 108 is performed by DSP 86 reading the sample values out of RAM 82 and performing the FFT. The complex amplitudes for the resulting frequency bins are then preferably provided by DSP 86 to control processor 20.

In step 110 power estimates are calculated for the FDMA channels under consideration. Preferably, as an initial step, the energies of the frequency bins corresponding to the band of FDMA channels under consideration are calculated. Note that generally there will be a significant portion of the frequency bins that lie outside the band of channels occupied by the desired FDMA channels, such as regions 126 shown in FIG. 3, and the values calculated for such bins in step 108 can be simply discarded. The energies for the remaining frequency bins can be calculated by calculating the absolute value squared for each sample (e.g., multiplying each complex value by its complex conjugate). Thereafter, a power value is estimated for each of the DCCH channels. This can be accomplished in a number of different ways. For example, it is possible to simply use the energy value calculated for the frequency bin whose center is closest to the center of the subject channel. Alternatively, the average energies over all frequency bins within each channel may be used as the power estimate for that channel. As a further refinement of the latter technique, the energies from frequency bins that straddle two different channels may be divided between those channels based on the portion of the bin that overlaps each channel. In any event, the power calculation for each such FDMA channel preferably is then adjusted to reflect the receiver gain (e.g., AGC) that was applied in generating the samples. Preferably, step 110 is preferred by control processor 20.

In step 112, a determination is made (preferably by control processor 20) as to whether an acceptable channel exists. Preferably, an acceptable channel is one whose power estimate is greater than a pre-determined threshold. If such a channel exists, then processing proceeds to step 114. Otherwise, control processor 20 causes the device to return to the sleep mode in step 116.

In step 114, FDMA communications are initiated with the identified channel. Preferably, if more than one good channel was identified in step 112, then FDMA communications are initiated using the channel corresponding to the highest power estimate.

The other typical situation in which a wireless mobile unit attempts to search the DCCHs for an AMPS system is when the wireless device already is communicating on a digital system, either in the "idle" mode (i.e., attempting to listen to the system and waiting for a page directed to the mobile unit) or while the mobile unit is in active communications over such digital system (e.g., during a telephone call). In such cases, it might become necessary to "hand off" the communication from the digital system to the analog FDMA system. In particular, this is likely to occur when the mobile unit is traveling away from a region with digital service and toward a region with analog service.

Figure 4:
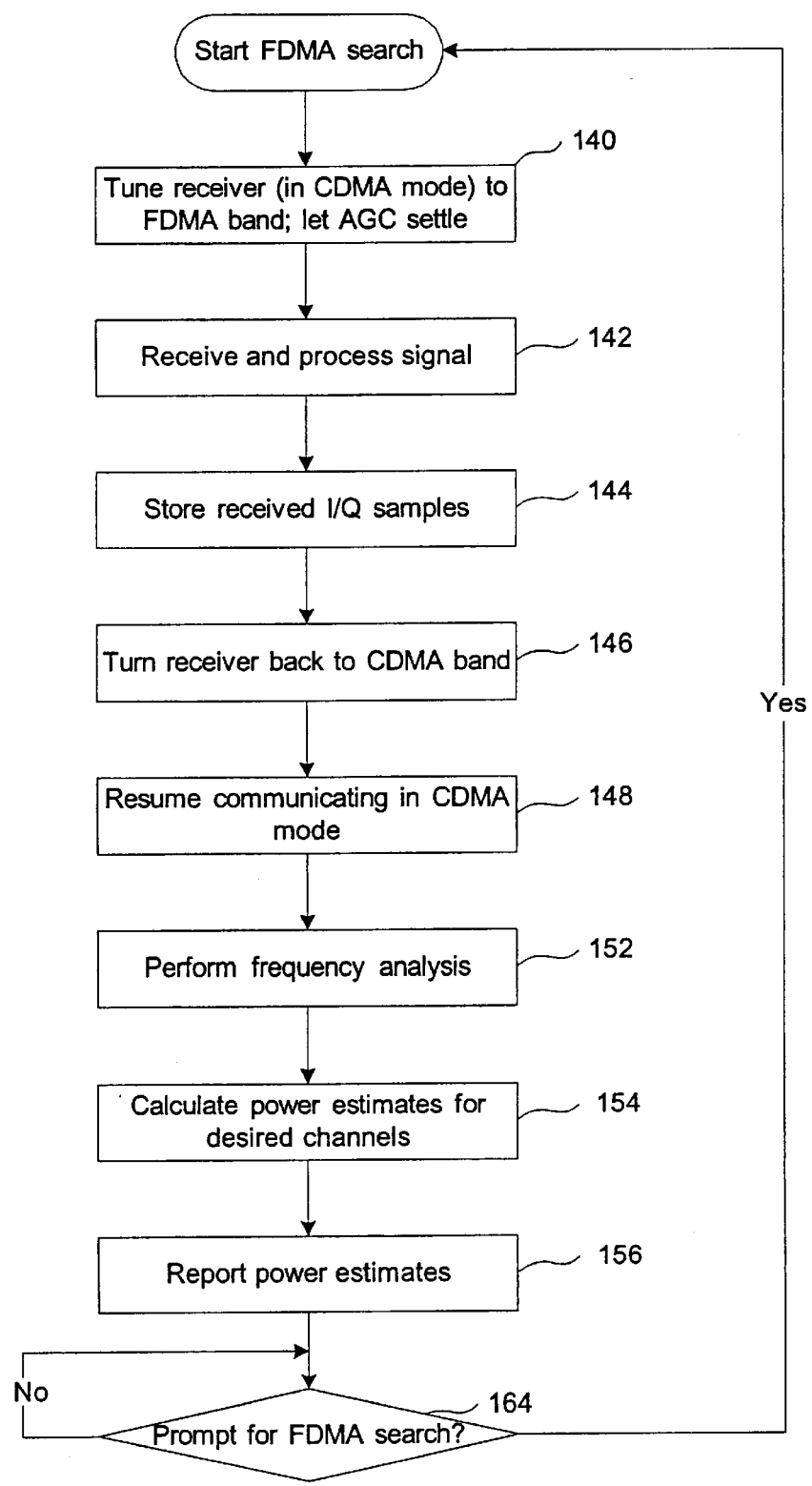
FIG. 4 illustrates a flow diagram for explaining FDMA searching according to a representative embodiment of the invention.

The process for searching the FDMA channels in this case is similar to that discussed above in connection with an attempt to acquire an FDMA system. FIG. 4 illustrates a flow diagram for explaining such processing in a preferred embodiment of the present invention. Briefly, according to FIG. 4, while still in the digital (e.g., CDMA) mode, the receiver is tuned to the desired FDMA band and the AGC is allowed to settle; the signal is then received and processed; the resulting I/Q samples are stored; the receiver is tuned back to the CDMA band; thereafter, the stored samples are processed using frequency analysis to calculate and report power estimates for the desired FDMA channels, while simultaneously communications continue in the digital (e.g., CDMA) mode.

In more detail, in step 140, the receiver is tuned to the desired FDMA band and AGC is allowed to settle. It is noted that this step is similar to step 102 described above, except that in the current processing the mobile unit was previously in the CDMA mode (either in idle or communications mode).

In step 142, the received signal is processed by CDMA portion 60. This step and the considerations pertaining thereto are identical to step 103 discussed above.

In step 144, the received complex samples are stored in RAM 82. This step and the considerations pertaining thereto are identical to step 104 described above.

In step 146, the receiver is tuned to again receive the CDMA band. Preferably, this means that RF PLL 22 is tuned to a frequency corresponding to the CDMA band.

In step 148, communications in the CDMA mode are resumed. Preferably, communications continue in the CDMA mode until the entire process (i.e., steps 140 et seq.) are again repeated.

In step 152, frequency analysis of the stored received samples is performed. This step and the considerations pertaining thereto are identical to step 108 described above.

In step 154, power estimates for the desired FDMA channels are calculated. This step and the considerations pertaining thereto are identical to step 110 described above.

In step 156, the calculated power estimates are reported to the base station via the open CDMA (or other digital) communications link. In this regard, as noted above, while the foregoing frequency analysis and power estimation processing was occurring, communications had been continuing over the CDMA (or other digital) system.

In addition, in step 164, the mobile unit periodically is prompted to again search for a FDMA system. Such prompts may be provided internally by the mobile unit or may be instigated by the base station. In addition, such prompts may be made at periodic intervals, in response to a decreased signal strength over the digital system, pursuant to any combination of the foregoing, and/or based on any other considerations.

With regard to the process described above, it should be noted that although in the preferred embodiment of the invention the power estimates for the FDMA channels are simply reported to the base station, in other embodiments of the invention, the mobile unit itself may process such power estimates in order to determine whether to acquire the FDMA system. In addition, although in the processing described above the receiver is tuned back to the CDMA band and communications are continued in the CDMA mode, it should be noted that if the mobile unit had previously been in the idle mode, the receiver simply would have been turned off after receiving the required FDMA samples.

Design System Environment.

As indicated above, many of the methods and techniques described herein preferably are practiced with a wireless telephone or other portable wireless device. Such a device typically will include, for example, at least some of the following components: one or more general-purpose central processing units (CPUs), one or more special-purpose processing units, such as a digital signal processor, read-only memory (ROM), random access memory (RAM), input/output circuitry for interfacing with other devices and, in certain cases, for connecting to one or more networks, a display (such as a liquid crystal display), output devices (such as a speaker), one or more input devices (such as a pointing device, keypad and/or microphone), and a real-time clock. In operation, the process steps to implement the above methods typically are executed by the CPU out of RAM or ROM.

Suitable devices for use in implementing the present invention may be obtained from various vendors. Various types of devices may be used depending upon the size and complexity of the tasks. For example, the above techniques may be applied in any personal appliances or devices that have wireless interfaces. In addition to small wireless devices, the techniques of the present invention may be implemented on larger devices, such as general-purpose or special-purpose computers. Suitable computers include mainframe computers, multiprocessor computers, workstations, personal computers, and laptop computers. In addition, any of the functionality described above can be implemented in software, hardware, firmware or any combination of these, with the particular implementation being selected based on known engineering tradeoffs.

It should be understood that the present invention also relates to machine readable media on which are stored program instructions for performing the methods of this invention. Such media include, by way of example, magnetic disks, magnetic tape, optically readable media such as CD ROMs and DVD ROMs, semiconductor memory such as PCMCIA "(Personal Computer Memory Card Industry Association)" cards, etc. In each case, the medium may take the form of a portable item such as a small disk, diskette, cassette, etc., or it may take the form of a relatively larger or immobile item such as a hard disk drive, ROM or RAM provided in a computer.

Conclusion.

The present invention therefore provides a technique in which a signal containing multiple FDMA channels can be collected at a single time. In the preferred embodiment of the present invention, multiple FDMA channels are received simultaneously using a receiver having a bandwidth that is widerthan a single FDMA channel under consideration. More preferably, this is accomplished in a dual-mode wireless device using the digital wireless receiver portion of the circuitry for simultaneously receiving such FDMA channels. Any wide band receiver may be used for this purpose, such as a receiver for IS95 CDMA or any of its derivatives or for UMTS "(Universal Mobile Telecommunication System)" or ARIB W-CDMA. "(Association of Radio Industries and Business Wideband Code Division Multiple Access)." In addition, similar processing could be done with a GSM front end, but because GSM is not as wide band, the gain generally would be less. Similarly, the narrow band signal being searched could be provided by any narrow band system, such as TACS as well as AMPS.

The advantage of simultaneously receiving a number of different FDMA channels is that the period of time during which the receiver has to be tuned to the FDMA band (or turned on in the case of the mobile unit awakening from the sleep mode) is significantly shorter than conventional techniques generally require. As a result, power consumption generally can be reduced (e.g., during a FDMA acquisition attempt) and/or the quality of communications over the digital system can be improved (e.g., when simultaneously communicating over the digital system and performing FDMA searching), all as described in detail above.

In the preferred embodiment of the invention, the received signal also is processed to simultaneously provide power estimates for multiple FDMA channels, such as by using FFT processing. This feature of the invention has the additional benefit of reducing the required processing time, in addition to the required receiver on time.

Variations on the embodiments described above also are possible. For example, although a single FFT (or other frequency transformation) is performed above, it is also possible to obtain plural sets of samples and perform a frequency transformation on each such set. The resulting multiple power estimates for each channel may then be combined to provide an overall power estimate for each channel.

In addition, as noted above, the number of samples collected may be varied to provide different results. One advantage of increasing the number of samples, as noted above, is an increase in the frequency resolution that can be obtained. Another advantage is that many of the frequency transformation techniques effectively average quantization noise over the collected samples for each frequency bin. Thus, even though the ADC for a typical CDMA receiver quantizes to only 4 bits, by performing a FFT on 128 samples raises the number of effective bits for each frequency bin to approximately 7.5. In addition, each doubling of the number of samples increases the effective number of quantization bits by approximately 0.5 bit.

In a further alternative embodiment, the above-described processing is performed for different groups of samples collected at different frequency shifts (e.g., as provided by RF PLL 22). In this regard, it is noted that it is common for the hardware to generate noise around the DC level. Therefore, by processing different groups of samples in the foregoing manner, the power estimates for the frequency bins near DC can be simply discarded. At the same time, by appropriately selecting the different frequency shifts, reliable power estimates can be obtained for all FDMA channels under consideration.

Still further, although the processing in the preferred embodiment of the invention is performed using digital processing techniques, it should be understood that the present invention is not limited to such techniques. Specifically, upon obtaining a signal (preferably, bandwidth limited) that includes multiple FDMA channels, frequency components for that signal can be determined using any known digital, analog, optical or other processing technique.

Thus, although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail above. Rather, it is intended that all such variations not departing from the spirit of the invention be considered as within the scope thereof as limited solely by the claims appended hereto.

Also, several different embodiments of the present invention are described above, with each such embodiment described as including certain features.

However, it is intended that the features described in connection with the discussion of any single embodiment are not limited to that embodiment, but may be included and/or arranged in various combinations in any of the other embodiments as well, as will be understood by those skilled in the art.

What is claimed is:

1. A method for use in acquiring/searching channels in a frequency division multiple access (FDMA) wireless system, said method comprising;

(a) communicating with a base station via a digital wireless system that uses a trunking technique other than FDMA;

(b) receiving a signal that includes a block of FDMA channels;

(c) filtering the received signal so as to select a frequency band that includes the block of FDMA channels;

(d) sampling the filtered signal to obtain a number of samples;

(e) processing the samples to obtain a value for each of plural different frequency bins;

(f) calculating a measure of power for a FDMA channel based on at least one of the values obtained in step (e), wherein step (b) is performed intermittently during short breaks in communicating in step (a).

2. A method according to claim 1, further comprising a step of storing the samples.

3. A method according to claim 1, wherein step (e) comprises performing Discrete Fourier Transform processing.

4. A method according to claim 3, wherein step (e) comprises performing Fast Fourier Transform processing.

5. A method according to claim 1, wherein sampling in step (d) occurs at a predetermined sampling rate for the digital wireless system.

6. A method according to claim 5, wherein the sampling rate is at least 1.2288 MegaHertz.

7. A method according to claim 1, further comprising steps of;

(g) identifying a frequency bin having a largest amplitude from among the plural different frequency bins; and (h) identifying the FDMA channel that corresponds to said frequency bin.

8. A method according to claim 1, wherein the block of FDMA channels includes all dedicated control channels used in the FDMA system.

9. A method for use in acquiring/searching channels in a frequency division multiple access (FDMA) wireless system, said method comprising;

(a) communicating with a base station via a digital wireless system that uses a trunking technique other than FDMA;

(b) receiving a signal that includes a block of FDMA channels;

(c) filtering the received signal so as to select a frequency band that includes the block of FDMA channels;

(d) sampling the filtered signal to obtain a number of samples;

(e) processing the samples to obtain a value for each of plural different frequency bins;

(f) calculating a measure of power for a FDMA channel based on at least one of the values obtained in step (e); and (g) reporting the measure of power to the base station via the digital wireless system.

10. A method according to claim 9, further comprising a step of storing the samples.

11. A method according to claim 9, wherein step (e) comprises performing Discrete Fourier Transform processing.

12. A method according to claim 9, wherein sampling in step (d) occurs at a predetermined sampling rate for the digital wireless system.

13. A method according to claim 9, further comprising steps of;

(h) identifying a frequency bin having a largest amplitude from among the plural different frequency bins; and (i) identifying the FDMA channel that corresponds to said frequency bin.

14. A method according to claim 9, wherein the block of FDMA channels includes all dedicated control channels used in the FDMA wireless system.

15. A method for use in acquiring/searching channels in a frequency division multiple access (FDMA) wireless system, said method comprising;

(a) receiving a signal that includes a block of FDMA channels;

(b) filtering the received signal so as to select a frequency band that includes the block of FDMA channels;

(c) sampling the filtered signal to obtain a number of samples;

(d) processing the samples to obtain a value for each of plural different frequency bins;

(e) calculating measures of Dower the FDMA channels based on the values obtained in step (d);

(f) identifying the FDMA channel that corresponds to a largest measure of power calculated in step (e); and (g) attempting to initiate communications on the FDMA system using the FDMA channel that corresponds to said largest calculated measure of power.

16. A method according to claim 15, wherein step (d) comprises performing Fourier Transform processing.

17. A method according to claim 15, wherein sampling in step (c) occurs at a predetermined sampling rate of at least ten times the frequency width of each said FDMA channels.

18. The method according to claim 15 further comprising deactivating the wireless device in the digital mode after step (c).

19. The method according to claim 15 wherein the sampling further includes selecting a predetermined number for samples so that a center of at least one frequency bin is no more than 4.8 kiloHz away from a center of at least one FDMA channel.

20. The method according to claim 15 wherein the processing further includes performing a weighting function to the samples.

21. The method according to claim 15 wherein the calculating further includes calculating energies of the frequency bins corresponding to the FDMA channels.

22. The method according to claim 15 further comprising stopping the wireless device from communicating in the analog mode if no FDMA channel is identified in step (f).

23. An apparatus for use in acquiring/searching channels in a frequency division multiple access (FDMA) wireless system, said apparatus comprising;

receiving means for receiving a signal that includes a block of FDMA channels;

filtering means for filtering the received signal so as to select a frequency band that includes the block of FDMA channels;

sampling means for sampling the filtered signal to obtain a number of samples;

processing means for processing the samples to obtain a value for each of plural different frequency bins;

calculating means for calculating measures of power for plural of the FDMA channels based on the values obtained by said processing means;

means for identifying the FDMA channel that corresponds to a largest measure of Dower calculated by said calculating means; and acquisition means for attempting to initiate communications on the FDMA system using the FDMA channel that corresponds to the largest calculated measure of power.

24. An apparatus according to claim 23, wherein the processing performed by said processing means comprises Discrete Fourier Transform processing of the samples.

25. An apparatus according to claim 23, wherein said sampling means samples the filtered signal at a rate of at least 1.2288 MegaHertz.

26. An apparatus according to claim 23, wherein said receiving means, said filtering means, said sampling means, said processing means and said calculating means are included within a digital communications means for communicating over a digital wireless system.

27. An apparatus according to claim 23, wherein said sampling means samples at a predetermined sampling rate for communicating over the digital wireless system.

28. An apparatus according to claim 23, wherein the block of FDMA channels includes all dedicated control channels used in the FDMA system.

29. An apparatus according to claim 23, further comprising means for storing the samples.

30. A method for acquiring/searching channels by a wide band wireless device capable of operating in either an analog mode using a first frequency band or a digital mode using a second frequency band, said method comprising;

(a) activating the wireless device in a digital mode and tuning to the first frequency band for communicating with a base station;

(b) receiving a signal that includes a block of frequency division multiple access (FDMA) channels;

(c) filtering the received signal so as to select a third frequency band that includes the block of FDMA channels;

(d) sampling the filtered signal to obtain a number of samples;

(e) processing the samples using a digital signal processing algorithm corresponding to one or more frequency bins;

(f) estimating power values for the FDMA channels based on the processing in step (e);

(g) determining whether an acceptable FDMA channel exists based on the estimated power values; and (h) if an acceptable FDMA channel is identified in step (g), initiating communications in the analog mode using the identified FDMA channel.

31. The method according to claim 30, further comprising deactivating the wireless device in the digital mode after step (d).

32. The method according to claim 30 wherein the digital mode is a CDMA mode.

33. The method according to claim 30, wherein the tuning further includes allowing an automatic gain control to settle for a predetermined period of time.

34. The method according to claim 30 wherein the sampling further includes selecting a predetermined number for samples so that a center of at least one frequency bin is no more than 4.8 kiloHz away from a center of at least one FDMA channel.

35. The method according to claim 30 wherein the processing further includes performing a weighting function to the samples.

36. The method according to claim 30 wherein the processing further includes performing a Fourier Transform based frequency transformation.

37. The method according to claim 30 wherein the estimating further includes calculating energies of the frequency bins corresponding to the FDMA channels.

38. The method according to claim 30 wherein the determining further includes comparing the power values of the FDMA channels with a predetermined thereshold value.

39. The method according to claim 38 wherein the determining further includes selecting the FDMA channel with the highest power value among all channels.

40. The method according to claim 30 further comprising stopping the wireless device from communication in the analog mode if no acceptable FDMA channel is identified.

* * * * *